US006278525B1

(12) United States Patent
Watanabe et al.

(10) Patent No.: US 6,278,525 B1
(45) **Date of Patent: *Aug. 21, 2001**

(54) CHARACTER PROCESSING WITH INDEFINITE CONTINUOUS PRINTING

(75) Inventors: Kenji Watanabe; Tomoyuki Shimmura; Takanobu Kameda; Chieko Aida, all of Tokyo; Hiroyasu Kurashina; Takeshi Hosokawa, both of Suwa, all of (JP)

(73) Assignees: King Jim Co., Ltd.; Seiko Epson Corporation, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/941,726

(22) Filed: Oct. 1, 1997

(30) Foreign Application Priority Data

Nov. 11, 1996 (JP) .................................................. 8-298907

(51) Int. Cl.[7] ..................................................... G06F 15/00

(52) U.S. Cl. ...................... 358/1.13; 358/1.14; 358/1.15; 358/1.18

(58) Field of Search .................................... 395/117, 111, 395/110, 112, 113, 114, 101; 400/299; 101/90; 399/43; 283/81; 347/5, 14, 23, 142; 358/1.18, 1.12, 1.11, 1.13, 1.14, 1.15, 1.1, 468, 296

(56) References Cited

U.S. PATENT DOCUMENTS

| | | | | |
|---|---|---|---|---|
| 4,197,797 | * | 4/1980 | Rayfield et al. | 101/90 |
| 4,454,596 | * | 6/1984 | Wunsch et al. | 361/680 |
| 4,462,708 | | 7/1984 | Luartes et al. | 400/304 |
| 4,553,180 | * | 11/1985 | Hasegawa | 360/74.4 |
| 4,740,912 | * | 4/1988 | Whitaker | 345/353 |
| 5,008,710 | * | 4/1991 | Kobayashi et al. | 399/317 |
| 5,060,135 | * | 10/1991 | Levine et al. | 345/351 |
| 5,214,364 | * | 5/1993 | Perdue et al. | 318/600 |
| 5,322,378 | * | 6/1994 | Ikeda et al. | 400/68 |
| 5,444,846 | * | 8/1995 | Nagashima | 345/504 |
| 5,636,315 | * | 6/1997 | Sugiyama et al. | 386/46 |
| 5,659,871 | * | 8/1997 | Fujimoto et al. | 399/384 |
| 5,729,351 | * | 3/1998 | Oh | 358/296 |
| 5,847,729 | * | 12/1998 | Takahashi et al. | 347/43 |
| 5,886,686 | * | 3/1999 | Chen | 345/168 |
| 5,923,357 | * | 7/1999 | Sugimoto et al. | 347/171 |

FOREIGN PATENT DOCUMENTS

| | | | | |
|---|---|---|---|---|
| 2182264 | | 6/1996 | (CA) . | |
| 2388445 | | 11/1978 | (FR) . | |
| 6286228 | | 10/1994 | (JP) . | |
| 9632290 | * | 10/1996 | (WO) | 347/2 |

* cited by examiner

*Primary Examiner*—Dov Popovici
(74) *Attorney, Agent, or Firm*—Lorusso & Loud

(57) ABSTRACT

The present invention relates to a character information processor having a function of printing an input character string on a print medium. The character information processor of the present invention includes print-instruction issuing unit for issuing a print-halt-instruction-waiting consecutive-print instruction of repeatedly printing a same character string on the print medium until a print halt instruction is issued, and printing unit for repeatedly printing the same character string on the print medium when the print-halt-instruction-waiting consecutive-print instruction is issued. Also, the processor includes print-halt-instruction issuing unit for issuing a print halt instruction of halting the repeated printing conducted by the printing unit, and print halting unit for halting the repeated printing conducted by the printing unit when the print halt instruction is issued.

11 Claims, 4 Drawing Sheets

CHARACTER PROCESSING WITH INDEFINITE CONTINUOUS PRINTING

BACKGROUND OF THE INVENTION

1. Field of the Invention

The present invention relates to a character information processor having a printing function. The present invention is preferably applicable particularly to a tape printing apparatus adapted to print an input character string having one or more lines on a tape.

2. Description of the Related Art

A tape printing apparatus is designed to enable the user to easily prepare a label originated by the user which is to be adhered on, for example, the spine cover of a document file.

A conventional tape printing apparatus has an operation key or the like provided on an operator panel and adapted to input characters so that a desired character string can be input by operating the operation key. Also, the tape printing apparatus has a tape feeding mechanism so that a tape can be fed and discharged through a tape discharging outlet. Further, the tape printing apparatus has a printing mechanism, including a thermal head, and a tape cutting mechanism provided in this order in the path of the tape being fed.

In the tape printing apparatus, when a print operation key is operated, under the control of control means, the tape is fed at a predetermined speed by the tape feeding mechanism, and a previously inputted character string is printed by the printing mechanism on the tape thus fed. Also, when printing the character string is completed, under the control of the control means, the tape feeding mechanism is further controlled to continue to feed the tape (i.e., to feed the tape without performing printing on the tape) until the printed portion of the tape is positioned outside the tape printing apparatus.

After feeding of the tape is completed, the tape is cut by the user with the tape cutting mechanism or by the action of an automatic cutting mechanism so that a label originated by the user having thereon a desired character string can be obtained.

Meanwhile, in a tape printing apparatus, as in the other information processors having a printing function, the user can specify printing on a plurality of labels so as to obtain a plurality of labels each having thereon the same character string. When printing must be performed on a considerably large number of labels with the tape printing apparatus, all the desired number of labels must be subjected to printing with the tape printing apparatus, unlike the case of the other character information processors. Specifically, in the case of the other character information processors, the user can obtain the plurality of print mediums by performing printing on only one print medium with the character information processor and repeatedly copying the one print medium with a copy machine so as to obtain the duplicates thereof. In contrast, in the case of the tape printing apparatus, the print medium (label) cannot be subjected to copying with a copy machine, and accordingly all the copies (labels) must be subjected to printing with the tape printing apparatus. Under the above circumstances, there is a strong need to equip a tape printing apparatus with an enhanced function of consecutively performing printing on a plurality of copies (labels) (hereinafter the function consecutively performing printing on a plurality of copies will be often referred to as "consecutive-print function".)

However, the conventional consecutive-print function has the following problems.

First, when the user needs to continue preparing the same labels until the loaded tape is used up, the conventional consecutive-print function fails to satisfy such user's need. This is because the user can only set a fixed value.

Secondly, when the user uses up the loaded tape stock before the number of labels on which printing is completed (hereinafter, often referred to as "printed number") reaches a maximum number for specification which the tape printing apparatus allows (hereinafter often referred to as "limit number"), the user may have difficulty in resuming the consecutive-print processing. Specifically, even though the user sets the number of labels to be printed to the limit number, the loaded tape may be used up before the printed number reaches the limit number depending on the length of the label stock. In such a case, the user must load a substitute tape, set again a remaining number (a number obtained by deducting the printed number from the limit number), and then resume the consecutive-print processing.

Thirdly, under the conventional consecutive-print function, the user must always specify a desired number of labels on which printing is to be performed before starting consecutive-print processing, that is, he cannot specify the desired number while the consecutive-print processing is being performed, so that it takes a long time for him to complete the consecutive-print processing.

The above-mentioned problems arise not only in the tape printing apparatus but also in the other character information processors having a printing function.

SUMMARY OF THE INVENTION

The present invention is accomplished in view of the above-mentioned problems. It is therefore an object of the present invention to provide a character information processor having an enhanced consecutive-print function and enhanced utility.

In order to solve the above-mentioned problems, the present invention provides a character information processor having a function of printing an input character string on a print medium, the processor including: (1) print-instruction issuing means for issuing a print-halt-instruction-waiting consecutive-print instruction during repeatedly printing a same character string on the print medium until a print halt instruction is issued; (2) printing means for repeatedly printing the same character string on the print medium when the print-halt-instruction-waiting consecutive-print instruction is issued; (3) print-halt instruction issuing means for issuing a print halt instruction of halting the repeated printing conducted by the printing means; and (4) print halting means for halting the repeated printing conducted by the printing means when the print halt instruction is issued.

It should be noted that in the present invention the term "character" refers to all print data including special characters, such as symbols and illustrations, and ornamental data, such as frames, ruled lines, and ground marks. Also, the term "character string" refers to a character string including these print data.

In the character information processor of the present invention, the print-instruction issuing means issues a print-halt-instruction-waiting consecutive-print instruction of repeatedly printing a same character string on the print medium until a print halt instruction is issued; printing means repeatedly prints the same character string on the print medium when the print-halt-instruction-waiting consecutive-print instruction is issued; print-halt-instruction issuing means issues a print halt instruction of halting the repeated printing conducted by the printing means; and print halting means halts the repeated printing conducted by the printing means.

BRIEF DESCRIPTION OF THE DRAWINGS

Other features, objects and advantages of the present invention will become apparent from the following description of the preferred embodiments with reference to the drawings in which like reference characters designate like or corresponding parts throughout several views, and in which.

DETAILED DESCRIPTION OF THE INVENTION

Hereinafter, embodiments of a tape printing apparatus to which the character information processor according to the present invention is applied will be described with reference to the drawings.

(A) Overall Constitution of Electrical Members in the Embodiment

First, the overall constitution of electrical members in a tape printing apparatus as an embodiment of the character information processor according to the present invention will be described with reference to FIG. 2, which is a block diagram showing the function of each element.

Figure 2:
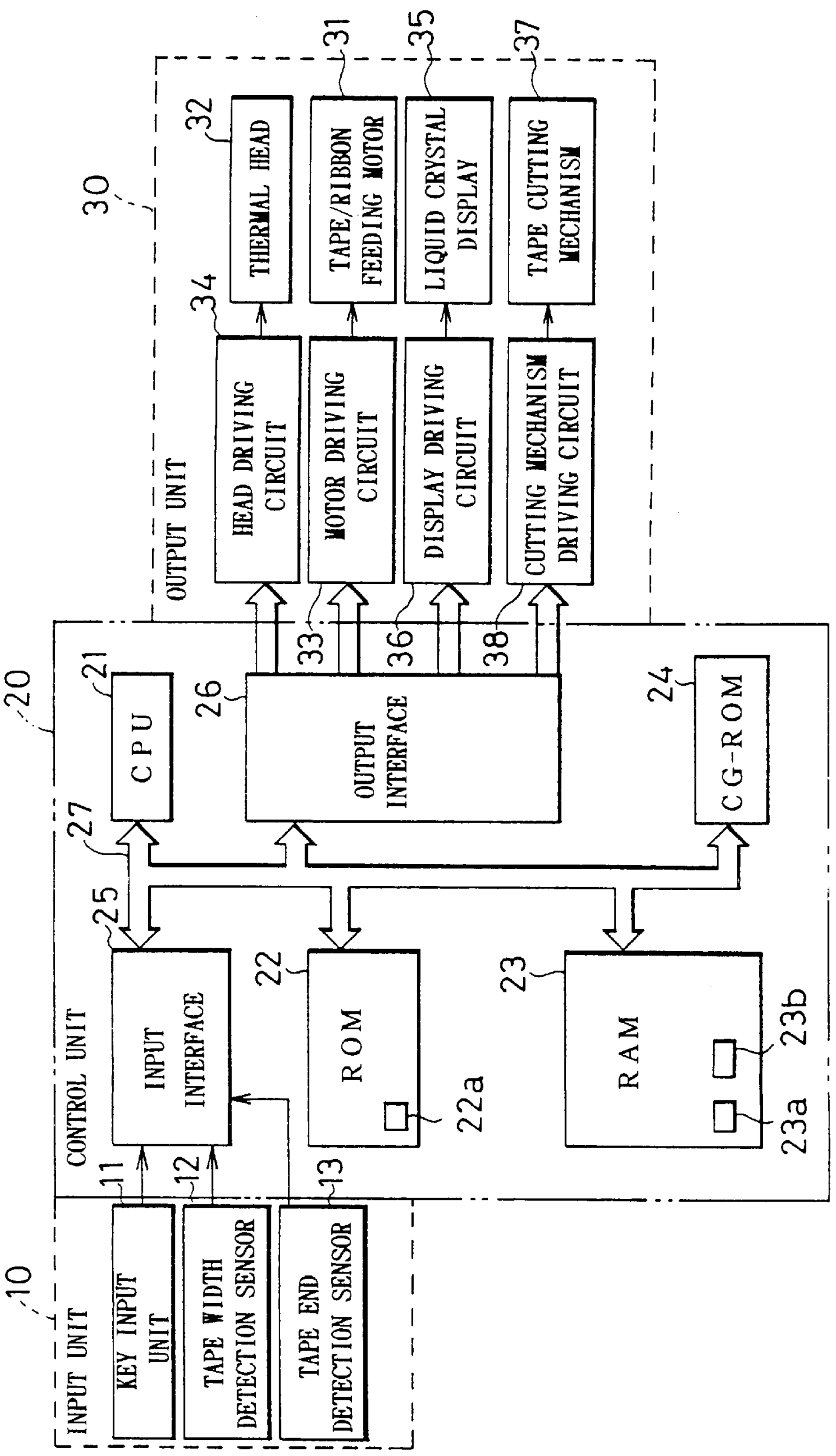
FIG. 2 is block diagram showing the overall constitution of the tape printing apparatus of the embodiment and the function of each element of the tape printing apparatus.

As shown in FIG. 2, similarly to other character information processors, the tape printing apparatus of this embodiment roughly includes an input unit 10, a control unit 20, and an output unit 30. The control unit 20 is adapted to execute processing in accordance with information supplied from the input unit 10, a processing stage at that time, and so on, and the result of the processing is outputted from the output unit 30 by way of display or print.

The input unit 10, while not detailed, includes a key input unit 11 having a depression key, a dial key and the like, a tape width detection sensor 12, and a tape end detection sensor 13. The key input unit 11 is adapted to generate character code data and various types of control data to be supplied to the control unit 20. The tape width detection sensor 12 is adapted to detect the width of the loaded tape and to supply tape width information to the control unit 20. Detecting the tape width by the sensor 12 is conducted by reading a physical identification element (e.g., a hole) provided on a tape cartridge, which accommodates a tape and an ink ribbon, and representing the width of the tape accommodated in the tape cartridge. The tape end detection sensor 13 is adapted to detect ending of the tape (i.e., to detect that the tape is used up) and to supply tape end information to the control unit 20. Ending of the tape is detected, for example, by detecting increased tension of the tape caused by the state that the tape cannot be further pulled out, or alternatively by detecting an identification element provided at the end of the tape.

The output unit 30 includes members serving as a print mechanism and members serving as a display mechanism.

The output unit 30 includes a tape/ribbon feeding motor 31 and a thermal head 32, both serving as the print mechanism. The tape/ribbon feeding motor 31 is constituted by, for example, a stepping motor and adapted to feed a tape and a ink ribbon loaded in the tape printing apparatus (both not shown) to a predetermined printing position or to the outside of the tape printing apparatus. The thermal head 32 is, for example, fixed and adapted to perform printing on the running tape by the thermal transferring method. The thermal head 32 have a performance of simultaneously printing, for example, 96 dots at its maximum. The tape/ribbon feeding motor 31 is driven by a motor driving circuit 33, and the thermal head 32 is driven by the head driving circuit 34, both driven under the control of the control unit 20.

The output unit 30 also includes a tape cutting mechanism 37 which is adapted to cut the tape and is driven by a tape cutting mechanism driving circuit 38 under the control of the control unit 20. Cutting of the tape may be conducted by the force applied by the user. It should be noted that, while the tape printing apparatus shown in FIG. 2 has the tape cutting mechanism 37, a tape printing apparatus in which no tape cutting mechanism is provided and cutting of the tape is conducted by the force applied by the user is also included in the present invention.

In the case of the tape printing apparatus according to this embodiment, the output unit 30 includes a liquid crystal display 35 as the display mechanism. The liquid crystal display 35 is driven by a display driving circuit 36 under the control of the control unit 20 and adapted to directly display an input character string, various attribute information, and so on, and also causes the indicators to be lighted or lighted-off. The indicators are adapted to indicate states of the attributes (such as character sizes and inputted lines) represented by the characters printed at the portions lying on the apparatus body and surrounding the display 35 by lightening, or lighting-off thereof.

The control unit 20 is constituted by, for example, a microcomputer. The control unit 20 includes a CPU 21, a ROM 22, a RAM 23, a character generator ROM (CG-ROM) 24, an input interface 25 and an output interface 26 that are connected via a system bus 27.

The ROM 22 stores various types of processing programs, and fixed data such as dictionary data for kana-kanji conversion. The RAM 23 is used as a working memory and adapted to store fixed data associated with the user input. The RAM 23 is non-volatile so that is retains its information even while the power is turned off.

The processing programs and the fixed data stored in the ROM 22, and the fixed data stored in the RAM 23 will be detailed later. The ROM 22 also stores a program 22*a* for consecutive-print processing. In the RAM 23, a print buffer 23*a* and a display buffer 23*b* are appropriately formed.

The CG-ROM 24 is adapted to store font information of letters provided in the tape printing apparatus, and to output, when code data for specifying a letter are supplied, font information corresponding thereto. The font information storedin the CG-ROM24 may be either of outline font and bitmap font. Alternatively, the CG-ROM 24 may store font information for display purposes and font information for print purposes, the former and latter font information being different from each other.

The input interface 25 is adapted to interface between the input unit 10 and the control unit 20. The output interface 26 is adapted to interface between the output unit 30 and the control unit 20.

The CPU 21 is adapted to execute a processing program stored in the ROM 22 that is determined in accordance with an input signal sent from the input unit 10 and a processing stage at that time while utilizing the RAM 23 as a working area or, if necessary, appropriately using fixed data stored in the ROM 22 or RAM 23. Also, the CPU 21 is adapted to cause the liquid crystal display 35 to display the state or result of the processing and so on, or causes the state or result of the processing to be printed on a tape (not shown).

(B) Consecutive-print Processing

The tape printing apparatus of this embodiment is adapted to execute consecutive-print processing in which a same character string is repeatedly printed on consecutive different labels. In the consecutive-print processing, a consecutive-print number representing the number of labels on which printing is performed is specified, and printing on a label is repeated up to the consecutive-print number. The tape printing apparatus of this embodiment is characterized by a way of specifying the consecutive-print number. More specifically, the tape printing apparatus of this embodiment is characterized in that the options of specifying the consecutive-print number include an option of not specifying a concrete number. Hereinafter, the consecutive-print processing in this embodiment having such a characteristic feature will be described with reference to FIG. 1.

In this embodiment, the user can specify the consecutive-print processing by operating the key input unit 11 while a character string is displayed on the liquid crystal display 35. When the key input unit 11 is operated, an instruction of starting consecutive print processing (hereinafter often referred to as "consecutive-print instruction") is issued, and the CPU 21 starts executing the program 22*a* for consecutive-print processing shown in FIG. 1.

In the consecutive-print processing, the CPU 21 firstly causes the liquid crystal display 35 to display a menu for specification of the consecutive-print number. When the user specifies a consecutive-print number, the CPU 21 introduces consecutive-print number information corresponding to the consecutive-print number thus specified and calculates the number of labels on which the consecutive-print processing is to be performed on the basis of consecutive-print number information thus introduced (step 100).

The menu for specification of the consecutive-print number includes a plurality of concrete numerals each representing a consecutive-print number, an option of "until-stop", and an option of canceling the consecutive-print processing; and the user can specify the consecutive-print number by selecting one of the concrete numerals, the option of "until-stop", or the option of canceling the consecutive-print processing.

The number of concrete numerals included in the menu is so designed to be made smaller taking into account the menu screen method thus employed. Specifically, the menu is designed in such a manner that: the consecutive-print number can be specified with respect to all the numbers when the number to be specified is not larger than 9; the consecutive-print number can be specified with respect to every second number when the number falls within a range between not less than 10 and less than 20; the consecutive-print number can be specified with respect to every fifth number when the number falls within a range between not less than 20 and less than 40; and the consecutive-print number can be specified with respect to every tenth number when the number falls within a range between not less than 40 and less than 100.

When the user specifies the consecutive-print number by selecting one of the concrete numerals or the option of canceling the consecutive-print processing, the CPU 21 performs processing in accordance with the selection (step 101). The processing executed at step 101 does not include characteristic features of this embodiment, and will not be detailed hereinafter.

In contrast, when the user specifies the consecutive-print number by selecting the option of "until-stop", the processing proceeds to consecutive-print processing with "until-stop" specification (hereinafter often referred to as "until-stop consecutive print processing"). Specifically, the CPU 21 sets the value of a print number parameter X, which is controlled therein, to an initial value of "1" (step 102). Thereafter, the CPU 21 causes the display 35 to display a message of confirming the user's intention as to whether or not he starts print processing (hereinafter often referred to as "print-start confirmation message"), and judges whether or not an instruction of starting print processing (hereinafter often referred to as "print-start instruction") is issued (step 103).

Figure 1:
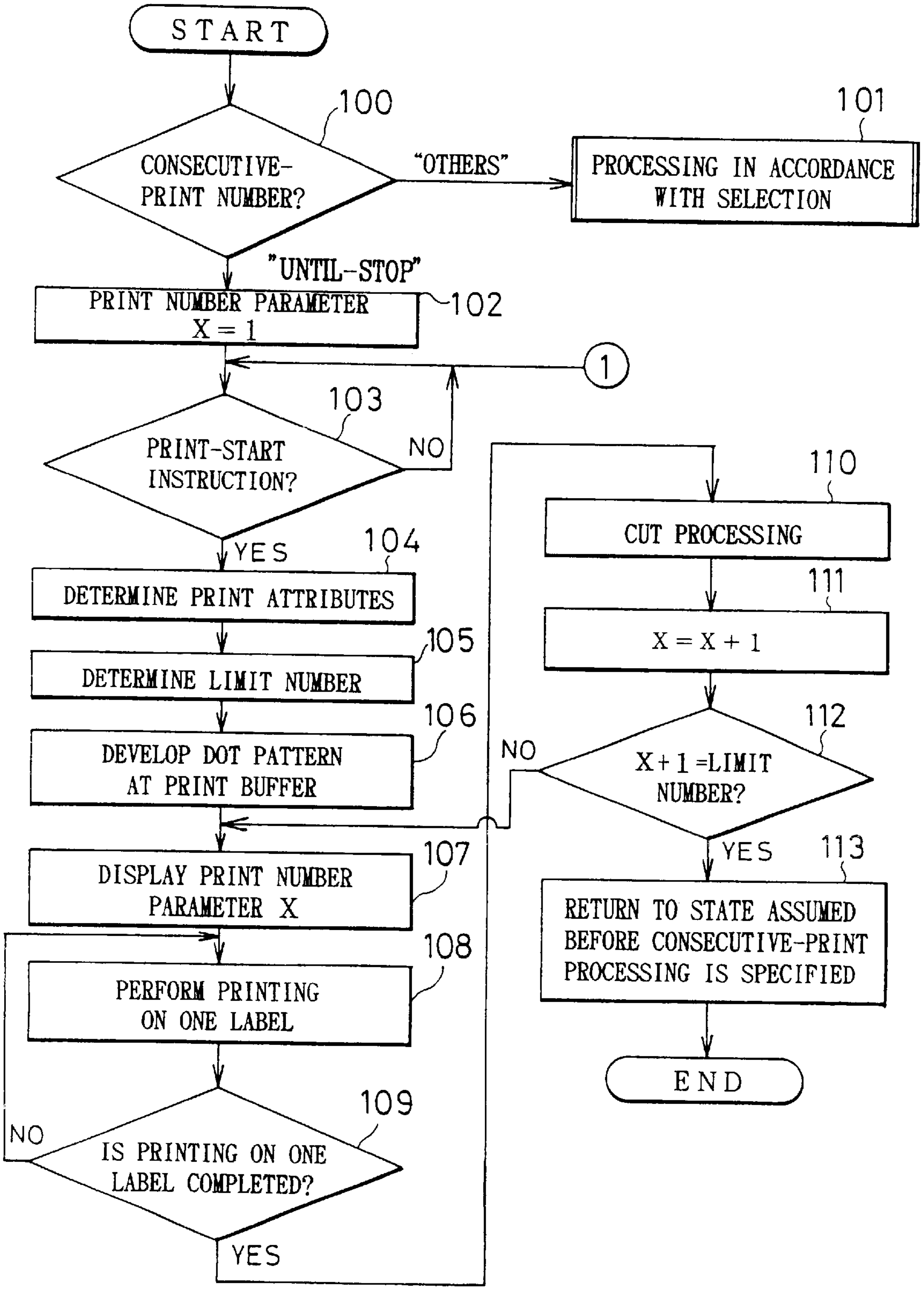
FIG. 1 is a flowchart of consecutive-print processing in an embodiment of a tape printing apparatus to which the character information processor according to the present invention is applied.

According to the flowchart in FIG. 1, it seems that processing proceeds only in the order of displaying the print-start confirmation message and then judging whether or not the print-start instruction is issued. However, after the print-start confirmation message is displayed, processing may return to specifying the consecutive-print number by selecting the other options, that is, the option of selecting one of the concrete numerals or the option of canceling the consecutive-print processing. Alternatively, the processing may proceed to a step of specifying another type of print processing than the consecutive-print processing.

When the user issues a print-start instruction by operating the key input unit 11, the CPU 21 causes the liquid crystal display 35 to display a message of "in preparation for printing". Then, the CPU 21 determines print attributes (e.g., a character size at each line, spacing between the characters, a label length, and the front and rear margins in the label) on the basis of the tape width detected by the tape width detection sensor 12, the number of lines contained in the input character string, and the number of characters contained in the longest line of the character string (step 104).

Figure 5:
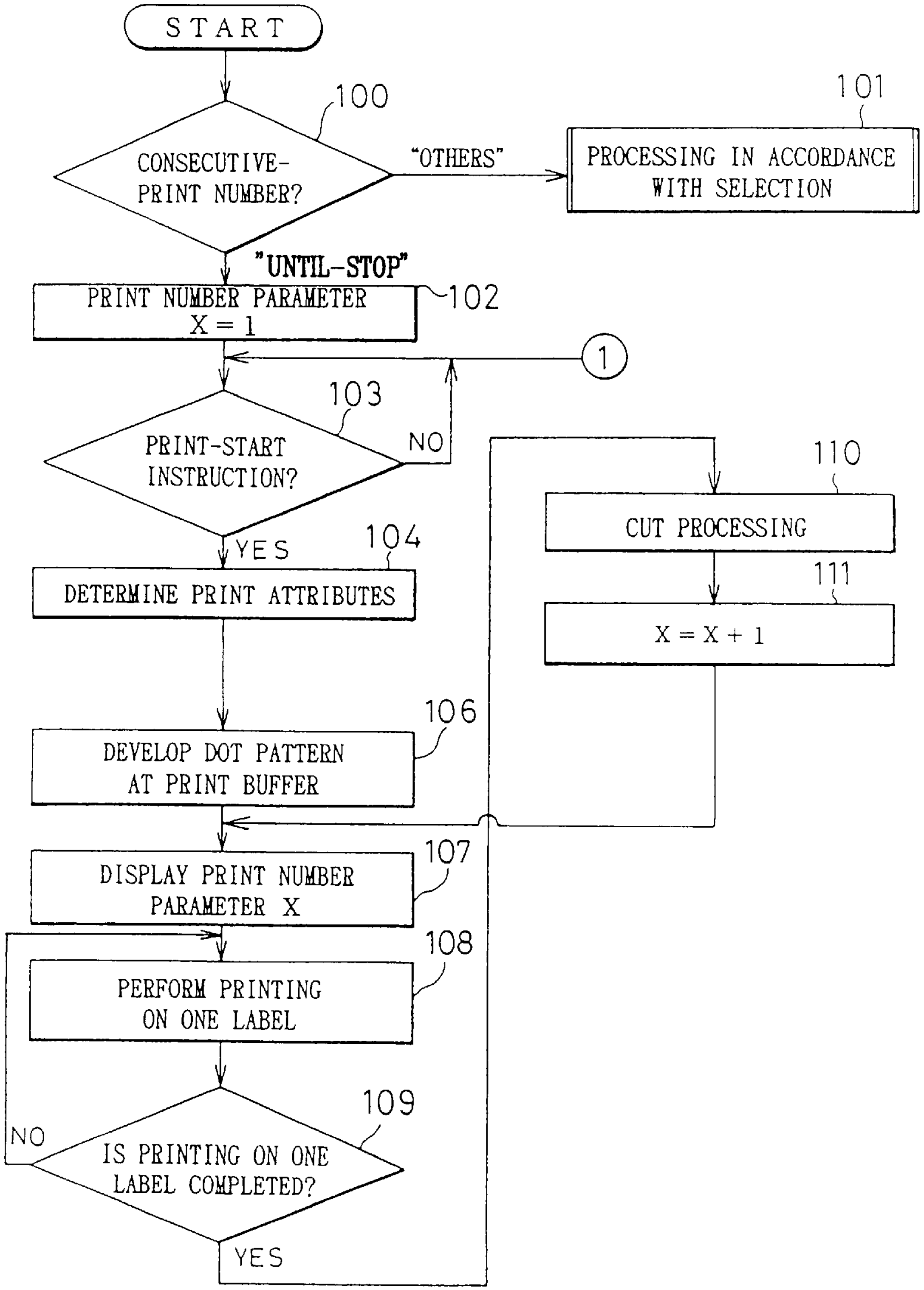
FIG. 5 is a flow chart similar to FIG. 1, but showing consecutive-print processing in the absense of any set number of articles to be printed.

Thereafter, the CPU 21 determines a limit number, at which the consecutive-print processing is to be stopped even when the user does not issue a print halt instruction as later described, on the basis of, for example, the label length thus determined (step 105). The limit number is determined to, for example, an integer portion of a quotient obtained by dividing the value representing the length of a tape accommodated in an unused tape cartridge by the value representing the length of the label. It should be noted that although "an unused cartridge" is mentioned in determining the limit number, this does not mean that the cartridge loaded in the tape printing apparatus should be an unused cartridge. Also, it should be noted that the way of determining the limit number is not limited thereto. For example, the limit number may be set to a fixed value (e.g., 100). Alternatively, the limit number may be dispensed with, that is, the tape printing apparatus may be configured in such a manner that the limit number is not set. In the cases where the limit number is set to a fixed value or where the limit number is not set, step 105 is not executed. Also, in the case where the limit number is not set, steps 112 and 113 are omitted as shown in FIG. 5, and accordingly the processing proceeds from step 111 to step 107.

Next, the CPU 21 causes the dot pattern of the input character string to be developed at the print buffer 23*a* in accordance with the print attributes thus determined, and attributes determined in connection with the character string (e.g., vertical writing, horizontal writing, half-tone dot meshing, and mirror image characters) (step 106). In the processing of developing the dot pattern, the CPU 21 appropriately accesses the CG-ROM 24 in accordance with the code data of the input character string and extracts a dot pattern therefrom.

Thereafter, the CPU 21 causes the liquid crystal display 35 to display the value of the print number parameter X (the value is set to "1" in the initial state thereof) and other information (e.g., information on the tape width and label length) (step 107). Thereafter, the CPU 21 performs printing on one label (including forming front and rear margins) (steps 108 and 109), and thereafter causes the tape cutting mechanism 37*b* to cut off the portion of the tape (hereinafter often referred to as "tape portion") on which printing is completed so as to obtain a label (step 110).

Thus, since the value of the print number parameter X is displayed at step 107, the user can know the order of the label being subjected to printing at present by observing the value. Based on the value thus observed, the user can judge whether or not he should issue an instruction of halting the consecutive-print processing (hereinafter often referred to as "print halt instruction") as later described.

When the tape printing apparatus does not have the automatic tape cutting mechanism, cutting-off of the tape portion is not performed but a cut mark is printed at a position where cutting is to be performed. For convenience of illustration, the flowchart in FIG. 1 shows that print processing for one label and the cut processing are executed at different steps. However, in actual operations, depending on the portion on which print processing is performed, cut processing may be executed while printing on the tape portion for the next label is being performed.

As described above, after processing with respect to one label is completed, the CPU 21 increments the print number parameter X by 1 (step 111), and thereafter verifies whether or not the number of labels on which print processing is completed has reached the limit number (step 112). When it is judged that the printed number has not reached the limit number, the CPU 21 returns to the above-mentioned step 107, and updates the value of the print number parameter X.

After the processing loop consisting of steps 107 to 112 is repeated and printing on the labels of the limit number is completed, the CPU 21 returns to the state assumed immediately before the consecutive-print processing is specified, that is, the state in which the input character string is displayed and another character string can be inputted (step 113), and then completes the sequence of the consecutive-print processing.

Figure 3:
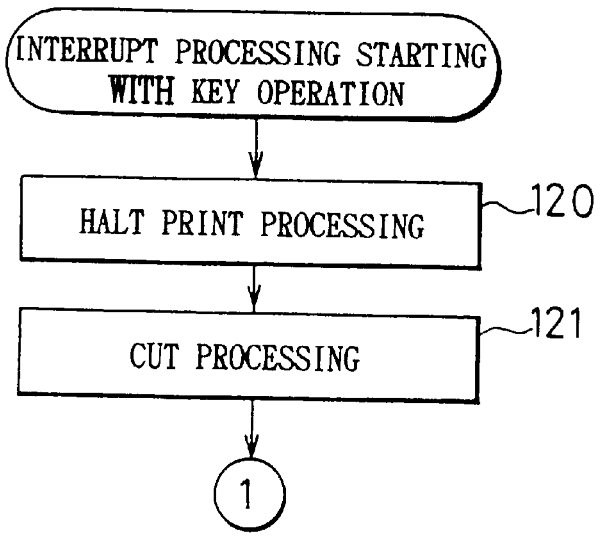
FIG. 3 is a flowchart of interrupt processing starting with a key operation which is inserted into the consecutive-print processing in the embodiment.
Figure 4:
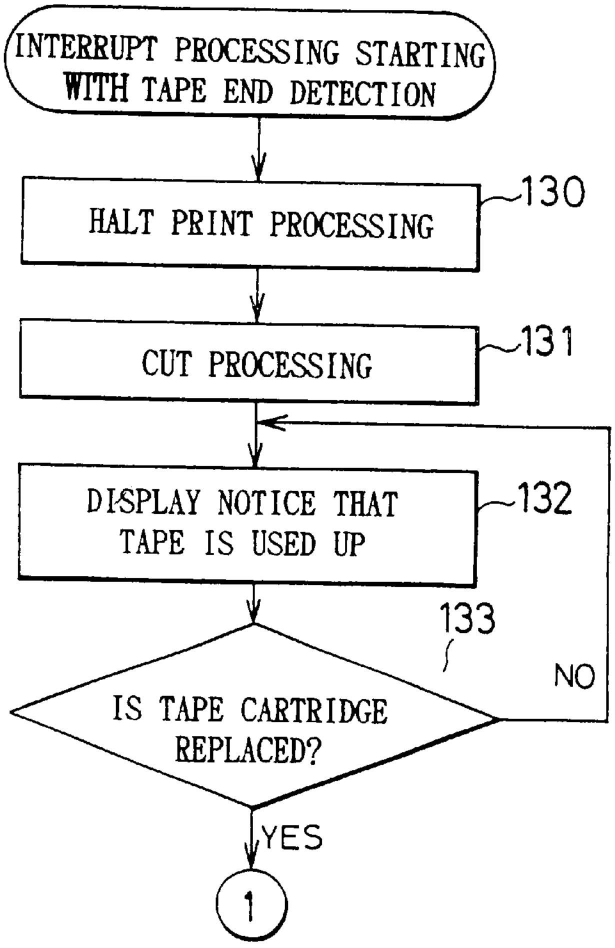
FIG. 4 is a flowchart of interrupt processing starting with tape end detection which is inserted into the consecutive-print processing of the embodiment.

In this embodiment, the CPU 21 allows interrupt processings as shown in FIGS. 3 and 4 to be inserted while the "until-stop" consecutive-print processing is being executed. Both of the interrupt porocessings in FIGS. 3 and 4 are directed to halting the "until-stop" consecutive-print processing. The interrupt processing shown in FIG. 3 starts with a key operation while the consecutive-print-halting interrupt processing shown in FIG.4 starts with tape end detection.

First, the interrupt processing starting with a key operation shown in FIG. 3 will be described.

When the CPU 21 is informed, from the input interface 25, that any arbitrary one of the keys provided in the input unit 11 is operated while the processing loop consisting of steps 107 to 112 is being performed, the CPU 21 proceeds to the interrupt processing shown in FIG. 3 and causes the print processing to immediately be halted (step 120), and then executes the cut processing (step 121). Thereafter, the CPU 21 proceeds to the processing to step 103 shown in FIG. 1.

In the cut processing executed at step 121, the tape is first fed until the print halt position formed on the tape reaches the position where the tape cutting mechanism 37 is provided, and thereafter the tape cutting mechanism 37 is operated. When the tape printing apparatus does not have an automatic cutting mechanism, only the feeding of the tape is executed.

In the above-described interrupt processing, step 120 of halting the print processing is executed immediately after the arbitrary key is operated to start the interrupt processing, that is, step 120 is executed before the print processing is completed. However, step 120 of halting the print processing may be performed after the print processing is completed (i.e., after the processing at step 111 is completed). In this case, cut processing is already executed at step 110, and therefore step 121 for the cut processing becomes unnecessary. In this case, however, the response time becomes too long, that is, a long time is taken between the moment when the user operates the arbitrary key to perform the interrupt processing and the moment when the consecutive-print processing is actually halted, and accordingly the user may feel anxiety. Therefore, it is preferred that step 120 of halting the consecutive-print processing is executed immediately after the arbitrary key is operated to start the interrupt processing.

In the case where processing proceeds to step 103 via the interrupt processing starting with a key operation, the user can terminate the consecutive-print processing at step 103, or alternatively resume the "until-stop" consecutive-print processing by issuing again a print start instruction. Since the print number parameter X has not been cleared yet, the printed number displayed at the time of resuming the consecutive-print processing becomes a number obtained by adding one to the number of labels on which printings are completed.

As described above, the user can halt the "until-stop" consecutive-print processing by operating an arbitrary key. This implies that the tape printing apparatus is waiting for the print halt instruction after the above-mentioned consecutive-print instruction is issued. In other words, the consecutive-print instruction can be expressed as print-halt-instruction-waiting consecutive-print instruction.

Further, after the "until-stop" consecutive-print processing is halted, the user can terminate the consecutive-print processing as it is, or alternatively resume and continue the "until-stop" consecutive-print processing thus halted. This implies that a pause function is performed.

When the consecutive-print number is specified by selecting one of the concrete numerals, in order to terminate the consecutive-print processing, the user must forcibly turn off the main power supply or operate a "cancel key" which is specially designated to halt the consecutive-print processing.

In the above embodiment, it is preferred to employ a configuration in which all the keys except for the main-power-supply turning-off key are equipped with a function of issuing the print halt instruction in the "until-stop" consecutive-print processing. That is, it is preferred that the user can halt the "until-stop" consecutive-print processing by operating any key except for the main-power-supply turning-off key. This is because this configuration enables the user to immediately issue an instruction of halting the "until-stop" consecutive-print processing whenever he wants to stop the consecutive-print processing.

If the print halt instruction key function is limited to a specific key, he may delay in some cases in issuing the print halt instruction. This is because, if the user forgets the specific key allocated as the print halt instruction key, he must confirm the location of the specific key, for example, by consulting the operation manual or the like. Further, even when the user remembers the specific key allocated as the print halt instruction key, if he is not yet accustomed to key operation, he may fail to promptly find out the specific key.

Next, interrupt processing starting with tape end detection will be described.

While performing the processing loop consisting of steps 107 to 112, when the CPU 21 is informed, from the input interface 25, that detection signal is outputted from the tape end detection sensor 13, the CPU 21 proceeds to the interrupt processing shown in FIG. 4. In the interruption processing, the CPU 21 immediately halts the print processing (step 130), performs cut processing (step 131), and causes the liquid crystal display 35 to display a notice that tape is used up (step 132). Then, when a sensor for detecting loading of the cartridge (not shown) detects that the tape cartridge is replaced, the CPU 21 proceeds to step 103 shown in FIG. 1 (step 133).

In the interrupt processing starting with tape end detection, when cut processing (step 131) is performed, the feeding of the tape is not executed. Further, when the tape printing apparatus does not have an automatic cutting mechanism, the cut processing (step 131) is not executed.

Also in the case where the processing proceeds to step 103 via the interrupt processing starting with the tape end detection, i.e., via the replacement of the tape cartridge executed at step 133, the user can terminate the consecutive-print processing, or alternatively resume the "until-stop" consecutive-print processing by issuing again a print-start instruction. Since the print number parameter X has not been cleared yet, the printed number displayed when the consecutive-print processing is resumed becomes a number obtained by adding one to the number of labels on which printings are completed.

(C) Advantages of the Embodiment

According to the tape printing apparatus of the embodiment, since there is provided a "until-stop" consecutive-print function of repeatedly printing the same character string until the user issues a print halt instruction, handlability in the consecutive-print processing is further enhanced in the following respects.

First, the consecutive-print number can be set without specifying a concrete number. Owing to this configuration, the user can repeat preparation of the same label until the loaded tape is used up.

Further, the user can start the consecutive-print processing without confirming a desired number because he can confirm the desired number while printing is being performed and can halt the print processing when the printed number reaches the desired number. Owing to this configuration, the user can use his time efficiently.

Further, the user can arbitrarily halt the print processing when the displayed printed number reaches the desired number while the "until-stop" consecutive-print processing is being performed. Owing to this configuration, the user can perform printing on the labels of the number which cannot be specified under the menu screen method, so that unnecessary printing can be prevented.

(D) Other Embodiments

As described above, the present invention can be embodied in the various ways and also the embodiments can be varied and modified in the various ways. However, the present invention is not limited thereto, and still other embodiments as described below can be realized.

For example, another special printing function may be incorporated into the "until-stop" consecutive-print function.

For example, an enlargement printing function may be incorporated into the "until-stop" consecutive-print function. Here, the enlargement printing function is a function of enlarging the input character string and printing enlarged characters on the labels in a divided manner. The labels each having thereon divided enlarged characters obtained by the enlargement printing function is positioned contiguously in the width direction thereof to obtain a "quasi label" having a width a predetermined times that of the loaded tape. In the case of the "until-stop" consecutive-print function incorporating the enlargement printing function, processing for enlargement printing is performed at the processing for development executed at step 106.

Further, a serial number printing function may be incorporated into the "until-stop" consecutive-print function. The serial number printing function is a function of adding a serial number to the character string of each label as a part of the character string. The "serial number" is a numeral representing the order of the label. The serial number is increased each time printing on one label is performed.

It should be noted that in the case of the "until-stop" consecutive-print function incorporating the serial number printing function, the term "the same character string" in the appended claims refers to the character string including the added serial number since the character string in each label is the same except for the serial number.

The "until-stop" consecutive-print function incorporating the serial number printing function is realized, for example, by providing between steps 107 and 108 processing of writing dot patterns representing serial number corresponding to the print number parameter X into the print buffer 23*a*.

Further, the "until-stop" consecutive-print function may incorporate an automatic pausing function (i.e., automatic print-halting function). The automatic pausing function is a function of momentarily halting the print processing each time printing on a predetermined number of sheets (e.g., 50 sheets) is completed.

The present invention is intended to be applied to a tape printing apparatus. However, the "until-stop" consecutive-print function, which is the characteristic feature of the present invention, can be applied to the other character information processors having a printing function.

Advantages of the Invention

As described above, according to the present invention, there is provided a function of issuing a halt-instruction-waiting consecutive-print instruction of repeatedly printing a same character string on the print medium until a print halt instruction is issued; the same character string is repeatedly printed on the print medium when the print-halt-instruction-waiting consecutive-print instruction is issued; and the repeated printing is halted when the print halt instruction is issued. Owing to this configuration, a character information printing can exhibit an enhanced consecutive-print function and an enhanced handlability.

Although the preferred embodiments of the present invention have been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A character information processor having a function of printing an input character string a plurality of times on a print medium in forming a corresponding plurality of separate copies each with a single copy of the input string, said processor comprising:

print-instruction issuing means selectable by a user commanding start of until-stop continuous printing for issuing an until-halt consecutive-print instruction, without setting the number of articles to be printed, to initiate repeatedly printing the input character string on the print medium until a print halt instruction is issued;

printing means, responsive to the until-halt consecutive-print instruction from the print instruction issuing means, for repeatedly printing the input character string on the print medium an indefinite number of times;

print-halt-instruction issuing means responsive to the user commanding the printing to stop or responsive to sensing an end of the print medium for issuing the print halt instruction for halting the repeated printing conducted by said printing means; and print halting means responsive to the print-halt-instruction issuing means for halting the repeated printing conducted by said printing means when the print halt instruction is issued.

2. A character information processor according to claim 1, wherein said print-halt-instruction issuing means issues the print halt instruction when a predetermined input key is operated.

3. A character information processor according to claim 1, wherein said print-halt-instruction issuing means issues the print halt instruction when any of a plurality of input keys except for main-power-supply turning-off key is operated.

4. A character information processor according to claim 1, wherein said processor includes alternative means for specifying a consecutive-print number by selecting one of a plurality of concrete numerals, and for performing consecutive-print processing for the consecutive-print number of articles.

5. A character information processor according to claim 4, including means for enabling the user to select one of processing for repeatedly printing indefinitely the input character string until the print halt instruction is issued, or processing for printing the consecutive-print number of the input character string.

6. A character information processor according to claim 1, including means for displaying the number of printed input character strings.

7. A character information processor according to claim 1, including means for momentarily pausing said printing means each time printing a predetermined number of input character strings is completed.

8. A character information processor having a function of printing an input character string a plurality of times on a print medium in forming a corresponding plurality of separate copies each with a single copy of the input string, said processor comprising:

first print-instruction issuing means selectable by a user for issuing a definite number consecutive-print instruction to initiate repeatedly printing the input character string on the print medium a definite set number of times;

second print-instruction issuing means selectable by the user commanding start of until-stop continuous printing for issuing an until-halt consecutive-print instruction, without setting the number of articles to be printed, to initiate repeatedly printing the input character string on the print med ium until a print halt instruction is issued, printing means, responsive to the definite number consecutive-print instruction from the first print-instruction issuing means, for repeatedly printing the input character string on the print medium the definite set number of times, and responsive to the until-halt consecutive-print instruction from the second print-instruction issuing means, for repeatedly printing the input character string on the print medium an indefinite number of times;

print-halt-instruction issuing means responsive to the user commanding the printing to stop or responsive to sensing an end of the print medium and directed to halting the indefinite repeated printing initiated by the second print-instruction issuing means for issuing the print halt instruction for halting the repeated printing conducted by said printing means; and print halting means responsive to the print-halt-instruction issuing means for halting the repeated printing conducted by said printing means when the print halt instruction is issued.

9. A character information processor according to claim 8, including means for enabling the user to select one of said first and second print-instruction issuing means to print the consecutive-print number of input character strings or to print indefinitely the input character string until the print halt instruction is issued, respectively.

10. A character information processor having a function of printing an input character string a plurality of times on a print medium in forming a corresponding plurality of separate copies each with a single copy of the input string, said processor comprising:

print-instruction issuing means selectable by a user for issuing an until-halt consecutive-print instruction, without setting the number of articles to be printed, to initiate repeatedly printing the input character string on the print medium until a print halt instruction is issued;

printing means, responsive to the until-halt consecutive-print instruction from the print-instruction issuing means, for repeatedly printing the input character string on the print medium an indefinite number of times;

means responsive to completion of each printing of the input character string on a section of the print medium for cutting the printed section from the print medium;

print-halt-instruction issuing means for issuing the print halt instruction for halting the repeated printing conducted by said printing means; and print halting means responsive to the print-halt-instruction issuing means for halting the repeated printing conducted by said printing means when the print halt instruction is issued.

11. A character information processor having a function of printing an input character string a plurality of times on a print medium in forming a corresponding plurality of separate copies each with a single copy of the input string, said processor comprising:

first print-instruction issuing means selectable by a user for issuing a definite number consecutive-print instruction to initiate repeatedly printing the input character string on the print medium a definite set number of times;

second print-instruction issuing means selectable by the user for issuing until-halt consecutive-print instruction, without setting the number of articles to be printed, to initiate repeatedly printing the input character string on the print medium until a print halt instruction is issued;

printing means, responsive to the definite number consecutive-print instruction from the first print-instruction issuing means, for repeatedly printing the input character string on the print medium the definite set number of times, and responsive to the until-halt consecutive-print instruction from the second print-instruction issuing means, for repeatedly printing the input character string on the print medium an indefinite number of times;

means responsive to completion of each printing of the input character string on a section of the print medium for cutting the printed section from the print medium;

print-halt-instruction issuing means directed to halting the indefinite repeated printing initiated by the second print-instruction issuing means for issuing the print halt instruction for halting the repeated printing conducted by said printing means; and print halting means responsive to the print-halt-instruction issuing means for halting the repeated printing conducted by said printing means when the print halt instruction is issued.

* * * * *